United States Patent
Singh et al.

(10) Patent No.: US 9,761,904 B2
(45) Date of Patent: Sep. 12, 2017

(54) ELECTRODES AND ELECTROCHEMICAL CELLS EMPLOYING METAL NANOPARTICLES SYNTHESIZED VIA A NOVEL REAGENT

(71) Applicant: Toyota Motor Engineering & Manufacturing North America, Inc., Erlanger, KY (US)

(72) Inventors: Nikhilendra Singh, Ypsilanti, MI (US); Michael Paul Rowe, Pinckney, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 69 days.

(21) Appl. No.: 14/219,836

(22) Filed: Mar. 19, 2014

(65) Prior Publication Data
US 2015/0099183 A1    Apr. 9, 2015

Related U.S. Application Data

(63) Continuation-in-part of application No. 14/046,120, filed on Oct. 4, 2013.

(51) Int. Cl.
*H01M 10/054* (2010.01)
*C22C 13/00* (2006.01)
*H01M 4/134* (2010.01)
*H01M 4/38* (2006.01)
*H01B 1/12* (2006.01)
*B22F 1/00* (2006.01)
*B22F 9/04* (2006.01)
*H01M 4/90* (2006.01)

(52) U.S. Cl.
CPC ......... *H01M 10/054* (2013.01); *B22F 1/0018* (2013.01); *B22F 9/04* (2013.01); *C22C 13/00* (2013.01); *H01B 1/122* (2013.01); *H01M 4/134* (2013.01); *H01M 4/387* (2013.01); *B22F 2009/043* (2013.01); *H01M 4/90* (2013.01); *H01M 4/9075* (2013.01); *H01M 4/9091* (2013.01)

(58) Field of Classification Search
CPC .... H01M 4/90; H01M 4/9075; H01M 4/9091; H01M 10/054
See application file for complete search history.

(56) References Cited

U.S. PATENT DOCUMENTS

| | | | |
|---|---|---|---|
| 7,041,350 B1 | 5/2006 | Rule et al. | |
| 2005/0217427 A1 | 10/2005 | Suthersan et al. | |
| 2007/0172737 A1 | 7/2007 | Oki et al. | |
| 2009/0117469 A1* | 5/2009 | Hiratsuka | H01M 4/366 429/231.8 |
| 2009/0264277 A1 | 10/2009 | Raj et al. | |
| 2012/0094178 A1* | 4/2012 | Loveridge et al. | 429/217 |
| 2013/0157133 A1* | 6/2013 | Chen et al. | 429/221 |
| 2013/0157147 A1* | 6/2013 | Li et al. | 429/332 |
| 2013/0189592 A1* | 7/2013 | Roumi | H01G 9/048 429/406 |
| 2013/0266851 A1* | 10/2013 | Singh | H01M 10/054 429/188 |
| 2015/0037711 A1 | 2/2015 | Cho et al. | |

FOREIGN PATENT DOCUMENTS

WO    2012007830 A1    1/2012

OTHER PUBLICATIONS

Wang (Wang et. Al, Journal of the Electrochemical Society, 151 (11) A1804-A1809 (2004)) published Oct. 4, 2004.*
Mohtadi (Magnesium Borohydride: From Hydrogen Storage to Magnesium Battery, Mohtadi et al., Angew. Chem. Int. Ed. 2012,51, 9780-9783 [published Aug. 21, 2012]).*
Rowe et al., "Synthesis of Metal Nanoparticles", co-pending U.S. Appl. No. 14/046,120, filed Oct. 4, 2013.
Singh et al., "Metal Nanoparticles Synthesized via a Novel Reagent and Application to Electrochemical Devices", co-pending U.S. Appl. No. 14/219,831, filed Mar. 19, 2014.
Mohtadi et al., "Magnesium Ion Batteries and Magnesium Electrodes Employing Magnesium Nanoparticles Synthesized via a Novel Reagent", co-pending U.S. Appl. No. 14/328,647, filed Jul. 10, 2014.
Mizuno et al, "Metal-Air Batteries and Electrodes Therefor Utilizing Metal Nanoparticles Synthesized via a Novel Mechanicochemical Route", co-pending U.S. Appl. No. 14/307,017, filed Jun. 17, 2014.
McDonald et al, "Electrodes Containing Iridium Nanoparticles for the Electrolytic Production of Oxygen From Water", co-pending U.S. Appl. No. 14/328,635, filed Jul. 10, 2014.
Singh et al., "A High Energy-Density TIN Anode for Rechargeable Magnesium-Ion Batteries", Chem. Commun., 2013, Nov. 8, 2012, pp. 149-151, vol. 49, RCS Publishing.
Singh et al., "Electronic Supplementary Material (ESI): A High Energy-Density Tin Anode for Rechargeable Magnesium-Ion Batteries", Electronic Supplementary Material (ESI) for Chemical Communications, Nov. 8, 2012, 4 pages, RCS Publishing.

* cited by examiner

*Primary Examiner* — Jeremiah Smith
(74) *Attorney, Agent, or Firm* — Christopher G. Darrow; Darrow Mustafa PC

(57) ABSTRACT

Electrodes employing as active material metal nanoparticles synthesized by a novel route are provided. The nanoparticle synthesis is facile and reproducible, and provides metal nanoparticles of very small dimension and high purity for a wide range of metals. The electrodes utilizing these nanoparticles thus may have superior capability. Electrochemical cells employing said electrodes are also provided.

6 Claims, 3 Drawing Sheets

ELECTRODES AND ELECTROCHEMICAL CELLS EMPLOYING METAL NANOPARTICLES SYNTHESIZED VIA A NOVEL REAGENT

CROSS-REFERENCE TO RELATED APPLICATIONS

This application is a continuation-in-part of application Ser. No. 14/046,120, filed Oct. 4, 2013, and which is herein incorporated by reference in its entirety.

TECHNICAL FIELD

The present invention relates in general to a method of synthesizing nanoparticles of zero-valent metal using a novel reagent, to fabrication of improved battery electrodes using the nanoparticles so produced, and to electrochemical cells employing such electrodes.

BACKGROUND

Metal nanoparticles, particles of elemental metal in pure or alloyed form with a dimension less than 100 nm, have unique physical, chemical, electrical, magnetic, optical, and other properties in comparison to their corresponding bulk metals. As such they are in use or under development in fields such as chemistry, medicine, energy, and advanced electronics, among others.

Synthetic methods for metallic nanoparticles are typically characterized as being "top-down" or "bottom-up" and comprise a variety of chemical, physical, and even biological approaches. Top-down techniques involve the physical breakdown of macroscale or bulk metals into nanoscale particles using a variety of physical forces. Bottom-up methods involve the formation of nanoparticles from isolated atoms, molecules, or clusters.

Top-down metal nanoparticle synthesis have included milling of macroscale metal particles, laser ablation of macroscale metals, and spark erosion of macroscale metals. Chemical approaches to bottom-up synthesis commonly involve the reduction of metal salt to zero-valent metal coupled with growth around nucleation seed particles or self-nucleation and growth into metal nanoparticles.

While each of these methods can be effective in certain circumstances each also has disadvantages or situational inapplicability. Direct milling methods can be limited in the size of particles obtainable (production of particles smaller than ~20 nm is often difficult) and can lead to loss of control of the stoichiometric ratios of alloys. Other physical methods can be expensive or otherwise unamenable to industrial scale.

Chemical reduction techniques can fail in situations where the metal cation is resistant to reduction. Mn(II) for example is notoriously impervious to chemical reduction. Conventional chemical reduction approaches can also be unsuitable for producing nanoparticles for applications that are highly sensitive to oxidation. Tin nanoparticles, for example, can be difficult to obtain from reduction approaches at sizes less than 20 nm and even when so obtained tend to contain a large proportion of $SnO_2$.

Tin is a promising material for battery electrodes. For example, as an anode in a Li-ion battery, tin can store approximately three times the charge density of the commonly used graphite anode. Recently it has been shown that tin-based material holds great promise in use as a Mg-ion insertion type anode for high energy density Mg-ion batteries. In particular, anode material fabricated from ~100 nm tin powder achieved high capacity and low insertion/extraction voltage.

SUMMARY

Electrodes and electrochemical cell employing metal nanoparticles synthesized by a novel route are provided.

In one aspect, an electrode comprising metal nanoparticles is disclosed, wherein the metal nanoparticles are synthesized by a method comprising adding surfactant to a reagent complex according to Formula I:

wherein $M^0$ is a zero-valent metal, X is a hydride, and y is an integral or fractional value greater than zero.

In another aspect, an electrochemical cell is disclosed. The electrochemical cell has an electrode, the electrode comprising metal nanoparticles, the metal nanoparticles having been synthesized by a method comprising adding surfactant to a reagent complex according to Formula I:

wherein $M^0$ is a zero-valent metal, X is a hydride, and y is an integral or fractional value greater than zero.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
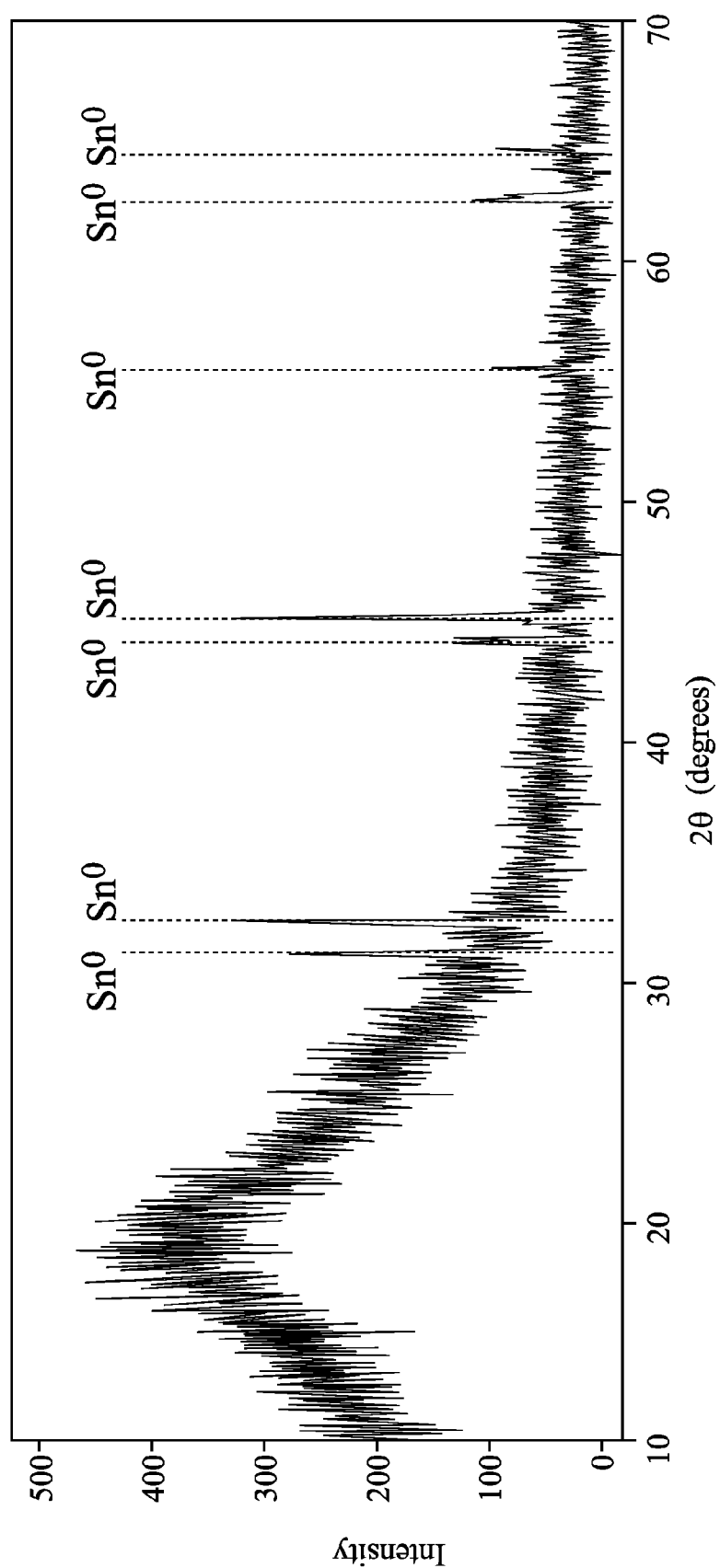
FIG. 1 is an x-ray diffraction spectrum of tin nanoparticles synthesized by the method reported here.

Electrodes are fabricated using, as active material, metal nanoparticles of high purity and potentially particularly small dimension, the nanoparticles being synthesized via a novel synthetic route. Electrochemical cells employ one or more such electrodes.

As explained in the following description, the method for synthesizing metal nanoparticles involves a reaction between a surfactant and a novel reagent complex comprising a zero-valent metal and a hydride. A "zero-valent metal" can alternatively be described as an elemental metal or as a metal which is in oxidation state zero. The novel reagent complex can alternatively be described as a complex.

As used here, a "metal" can refer to an alkaline earth metal, an alkali metal, a transition metal, or a post-transition metal. The phrase "transition metal" can refer to any D-block metal of Groups 3 through 12. The phrase "post-transition metal" can refer to any metal of the Groups 13 through 16, including aluminum, gallium, indium, tin, thallium, lead, or bismuth. In some variations, a metal will be a transition metal or a post-transition metal. In some examples a metal will be tin.

As used here, a "hydride" can be a solid metal hydride (e.g. NaH, or MgH$_2$), metalloid hydride (e.g. BH$_3$), complex metal hydride (e.g. LiAlH$_4$), or salt metalloid hydride also referred to as a salt hydride (e.g. LiBH$_4$). The term "metalloid" can refer to any of boron, silicon, germanium, arsenic, antimony, tellurium, or polonium. In some examples the hydride will be LiBH$_4$. Any member of a group consisting of complex metal hydrides and salt metalloid hydrides can be called a "complex hydride". It is to be appreciated that the term hydride as used herein can also encompass a corresponding deuteride or tritide.

A method for synthesizing metal nanoparticles includes the step of adding surfactant to a reagent complex:

$$M^0\text{-}X_y, \quad \text{I,}$$

wherein $M^0$ is a zero-valent metal, wherein X is a hydride molecule, and wherein y is a value greater than zero. In many instances y can be a value greater than zero and less than or equal to four. The value represented by y can be an integral value or a fractional value, such as 2.5. The complex described by Formula I is referred to alternatively herein as a "reagent complex".

The reagent complex can be a complex of individual molecular entities, such as a single metal atom in oxidation state zero in complex with one or more hydride molecules. Alternatively the complex described by Formula I can exist as a molecular cluster, such as a cluster of metal atoms in oxidation state zero interspersed with hydride molecules, or a cluster of metal atoms in oxidation state zero, the cluster surface-coated with hydride molecules or the salt hydride interspersed throughout the cluster.

In some aspects of the method for synthesizing metal nanoparticles, the reagent complex can be in suspended contact with a solvent or solvent system. In some variations, suitable solvents or solvent systems will include those in which a suspension of the reagent complex is stable for an interval of at least one day in an inert environment. In some variations, suitable solvents or solvent systems will include those in which a suspension of the reagent complex is stable for an interval of at least one hour in an inert environment. In some variations, suitable solvents or solvent systems will include those in which a suspension of the reagent complex is stable for an interval of at least five minutes in an inert environment.

The phrase "an inert environment" as used here can include an atmospheric environment that is anhydrous. The phrase "an inert environment" as used here can include an atmospheric environment that is oxygen-free. The phrase "an inert environment" as used here can include an atmospheric environment that is both anhydrous and oxygen-free. The phrase "an inert environment" as used here can include enclosure in an ambient atmosphere comprising an inert gas such as argon, or enclosure in a space that is under vacuum.

The term "stable" as used in the phrase, "in which the reagent complex is stable for an interval" can mean that the reagent complex does not appreciably dissociate or undergo covalent transformation.

The solvent or solvent system employed in certain various aspects disclosed here can be a material that is non-reactive toward the hydride incorporated into the reagent complex. As used above in the phrase "material that is non-reactive toward the hydride", the term "non-reactive" can mean that the material, i.e. the solvent or solvent system, does not directly participate in or bring about covalent reaction of the hydride of the reagent complex to a thermodynamically significant extent. According to such a criterion, suitable solvents or solvent systems can vary depending on the hydride being used. In some variations this can include a solvent or solvent system that is aprotic, non-oxidative or both.

Non-limiting examples of suitable solvents or solvent system components can include acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diglyme (diethylene glycol, dimethyl ether), 1,2-dimethoxy-ethane (glyme, DME), dimethylether, dimethyl-formamide (DMF), dimethyl sulfoxide (DMSO), dioxane, ethanol, ethyl acetate, ethylene glycol, glycerin, heptane, Hexamethylphosphoramide (HMPA), Hexamethylphosphorous triamide (HMPT), hexane, methanol, methyl t-butyl ether (MTBE), methylene chloride, N-methyl-2-pyrrolidinone (NMP), nitromethane, pentane, Petroleum ether (ligroine), 1-propanol, 2-propanol, pyridine, tetrahydrofuran (THF), toluene, triethyl amine, o-xylene, m-xylene, or p-xylene.

As non-limiting examples, in some instances a halogenated alkyl solvent can be acceptable, in some instances an alkyl sulfoxide can be acceptable, in other instances an ethereal solvent can be acceptable. In some variations THF can be a suitable solvent or solvent system component.

In some aspects of the method for synthesizing metal nanoparticles, the surfactant can be suspended or dissolved in a solvent or solvent system. In different variations wherein the reagent complex is in suspended contact with a solvent or solvent system and the surfactant is suspended or dissolved in a solvent or solvent system, the reagent complex can be in suspended contact with a solvent or solvent system of the same or different composition as compared to the solvent or solvent system in which the surfactant is dissolved or suspended.

In some aspects of the method for synthesizing metal nanoparticles, the reagent complex can be combined with surfactant in the absence of solvent. In some such cases a solvent or solvent system can be added subsequent to such combination. In other aspects, surfactant which is not suspended or dissolved in a solvent or solvent system can be added to a reagent complex which is in suspended contact with a solvent or solvent system. In yet other aspects, surfactant which is suspended or dissolved in a solvent or solvent system can be added to a reagent complex which is not in suspended contact with a solvent or solvent system.

The surfactant can be any known in the art. Usable surfactants can include nonionic, cationic, anionic, amphoteric, zwitterionic, and polymeric surfactants and combinations thereof. Such surfactants typically have a lipophilic moiety that is hydrocarbon based, organosilane based, or fluorocarbon based. Without implying limitation, examples of types of surfactants which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, alkyl amines, nitriles, quaternary ammonium salts, carboxybetaines, sulfobetaines, or polymeric surfactants.

In some instances the surfactant employed in the method for synthesizing metal nanoparticles will be one capable of oxidizing, protonating, or otherwise covalently modifying the hydride incorporated in the reagent complex. In some variations the surfactant can be a carboxylate, nitrile, or amine. In some examples the surfactant can be octylamine.

In some variations the method for synthesizing metal nanoparticles can be performed under an anhydrous environment, under an oxygen-free environment, or under an environment that is anhydrous and oxygen-free. For example, the method for synthesizing metal nanoparticles can be performed under argon gas or under vacuum. While the zero-valent metal $M^0$ can contain some impurities such as metal oxides, the method for synthesizing metal nanoparticles can in some instances produce pure metal nanoparticles, free of oxide species. Such an instance is shown in FIG. 1, an x-ray diffraction spectrum of zero-valent tin nanoparticles produced by the method.

It is to be noted that the diffraction spectrum of FIG. 1 indexes to pure, zero-valent tin, free of oxides and measures an average maximum particle dimension of 11 nm. In some variations, the method for synthesizing metal nanoparticles disclosed here can produce nanoparticles having an average maximum dimension less than 50 nm. In other variations, the method for synthesizing metal nanoparticles can produce nanoparticles having an average maximum dimension less than 20 nm. In yet other variations, the method can produce nanoparticles having an average maximum dimension of about 10 nm or less.

The complex described by Formula I can be produced by any suitable process. A non-limiting example of a suitable process for preparing the reagent complex includes a step of ball-milling a hydride with a preparation composed of a zero-valent metal. A process employing this step for production of a reagent complex will be referred to herein as the "example process". In many instances the preparation composed of a zero-valent metal employed in the example process will have a high surface-area-to-mass ratio.

In some instances the preparation composed of a zero-valent metal will be a metal powder. It is contemplated that the preparation composed of a zero-valent metal could be a highly porous metal, a metal with a honeycomb structure, or some other preparation with a high surface-area-to-mass ratio. The preparation composed of a zero-valent metal may, at times, be referred to herein as a "preparation containing a zero-valent metal", either phrase indicating a material consisting substantially of a metal in its elemental form and wherein some amount of impurities may be present.

In some instances the preparation containing a zero-valent metal can include a zero-valent transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. In some instances the preparation containing a zero-valent metal can include a zero-valent post-transition metal. Suitable post-transition metals include aluminum, gallium, indium, tin, thallium, lead, or bismuth. In some particular instances, the preparation containing a zero-valent metal will be a preparation containing tin, such as tin powder.

It is to be understood that the zero-valent metal, be it transition metal, post-transition metal, alkali metal, or alkaline earth metal, will be in oxidation state zero. As used herein, "zero-valent" and "oxidation state zero" are taken to mean that the material can exhibit a substantial, but not necessarily complete, zero oxidation state. For example, the preparation containing a zero-valent metal can include some surface impurities such as oxides.

It is contemplated that the phrase "high-surface-area-to-mass ratio" can encompass a broad range of surface-area-to-mass ratios and, in general, the surface-area-to-mass ratio of the preparation composed of a zero-valent metal employed will be that which is required by the time constraints of the example process. In many instances, a higher surface-area-to-mass ratio of the preparation composed of a zero-valent metal will lead to more rapid completion of the example process. In the case where the preparation composed of a zero-valent metal is a metal powder for example, smaller particle size of the metal powder can tend to lead to more rapid completion of the example process and resultant production of the reagent complex.

Non-limiting examples of hydrides suitable for use in the example process include sodium borohydride, lithium aluminium hydride, diisobutylaluminium hydride (DIBAL), Lithium triethylborohydride (super hydride), sodium hydride and potassium hydride, calcium hydride, lithium hydride, or borane.

In some variations of the example process, the hydride can be mixed with the preparation composed of a zero-valent metal in a 1:1 stoichiometric ratio of hydride molecules to metal atoms. In other variations the stoichiometric ratio can be 2:1, 3:1, 4:1 or higher. In some variations the stoichiometric ratio of hydride molecules to metal atoms in the preparation composed of a zero-valent metal can also include fractional quantities, such as 2.5:1. It is to be understood that, in cases where the example process is employed for production of the reagent complex, the stoichiometry of admixture in the example process will tend to control the stoichiometry of the complex according to Formula I as indicated by the value of y.

It is contemplated that a ball mill used in the example process can be of any type. For example the ball mill employed can be a drum ball mill, a jet mill, a bead mill, a horizontal rotary ball mill, a vibration ball mill or a planetary ball mill. In some examples the ball mill employed in the example process will be a planetary ball mill.

It is contemplated that the ball-milling media used in the example process can be of any composition. For example, the ball-milling media employed can be composed of metal such as stainless steel, brass, or hardened lead or they can be composed of ceramic such as alumina or silica. In some variations the ball milling media in the example process will be stainless steel. It is to be appreciated that the ball-milling media can be of a variety of shapes, for example they can be cylindrical or spherical. In some variations the ball-milling media will be spherical.

Optionally, a variety of analytical techniques can be employed to monitor the example process and to determine successful completion thereof. Some such techniques, such as x-ray photoelectron spectroscopy (XPS) and x-ray diffraction (XRD) are discussed below, but any analytical approach known to be useful in the art can be optionally employed.

Figure 2A:
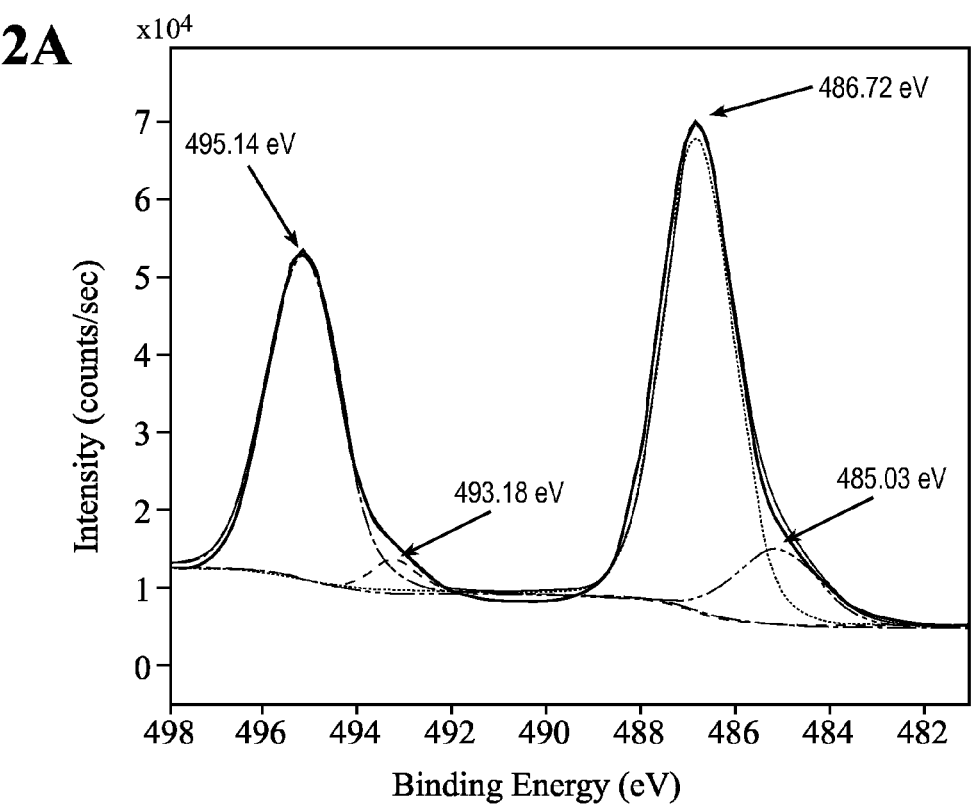
FIG. 2A is an x-ray photoelectron spectrum of $Sn^0$ powder.
Figure 2B:
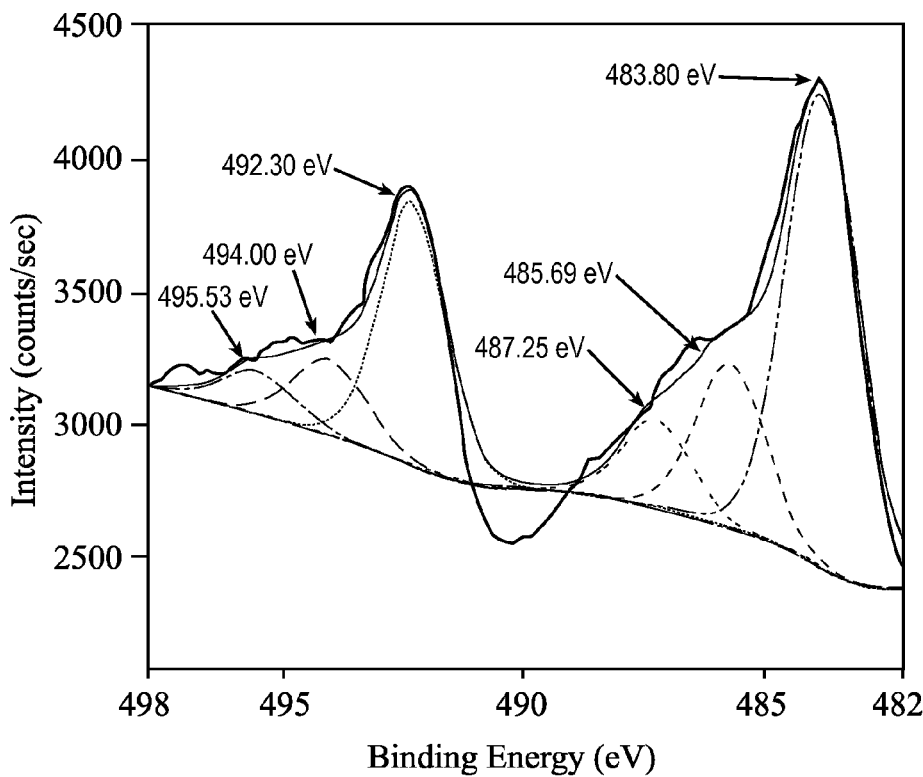
FIG. 2B is an x-ray photoelectron spectrum of an Sn.$(LiBH_4)_2$ complex prepared by the process reported here.

XPS scans in the tin region are shown for elemental tin powder and for a reagent complex $Sn.(LiBH_4)_2$, in FIGS. 2A and 2B, respectively. In FIGS. 2A and 2B, heavy solid lines show the raw XPS data and light solid lines show the adjusted data. Dashed and/or dotted lines show the individual deconvoluted peaks of the spectra. The center points in electronVolts of deconvoluted peak maxima are indicated by arrows.

Figure 2C:
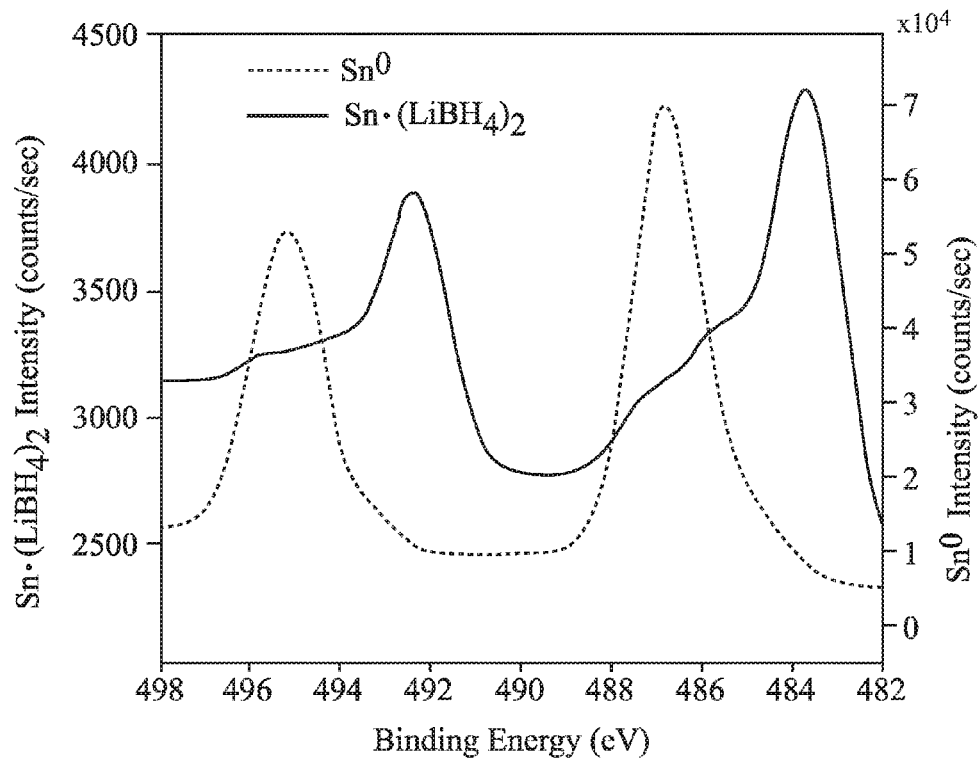
FIG. 2C is an overlay of the x-ray spectrum of $Sn^0$ powder of FIG. 2A and the x-ray photoelectron spectrum of an Sn.$(LiBH_4)_2$ complex prepared by the process of FIG. 2B.

FIG. 2C shows an overlay of the adjusted spectrum of uncomplexed tin (dotted line), from FIG. 2A, with the adjusted spectrum of the $Sn.(LiBH_4)_2$ complex (solid line), from FIG. 2B. As can be seen in FIG. 2C, complex formation between the zero-valent tin and the lithium borohydride results in the appearance of new peaks and a general shift of the spectrum toward lower electronic energy of the observed electrons of the zero-valent metal. In some instances where the reagent complex is prepared by the example process, x-ray photoelectron spectra of the zero-valent metal incorporated in the reagent complex will be generally shifted toward lower energy as compared to the spectra of the uncomplexed zero-valent metal. In some instances, reagent complexes wherein $M^0$ is tin and X is lithium borohydride can be identified by the presence of an x-ray photoelectron spectroscopy peak centered at about 484 eV.

In some variations, the example process can be performed under an anhydrous environment, an oxygen-free environment, or an anhydrous and oxygen-free environment. For example, the example process can be performed under argon gas or under vacuum. This optional feature can be included, for example, when the hydride used in the example process is a hydride that is sensitive to molecular oxygen, water, or both.

Battery electrodes comprising metal nanoparticles synthesized by the methods described above are disclosed. As mentioned, Mg-ion batteries employing tin-based anodes have shown promise as high energy density alternatives to conventional Li-ion batteries (N. Singh et al., *Chem. Commun.*, 2013, 49, 149-151; incorporated by reference herein in its entirety). In particular, tin anodes based on ~100 nm $Sn^0$ powder have shown impressive capacity and insertion/extraction voltage in such systems. A dramatic decrease in the tin nanostructure of such an anode can improve such a system's rate capability and cyclability, but requires tin nanoparticles which are oxide-free. Tin nanoparticles such as 11 nm oxide free tin nanoparticles disclosed here and represented in FIG. 1 can be a useful anode material in such a battery system.

An electrode can include an active material comprising metal nanoparticles which have been synthesized by the method for synthesizing metal nanoparticles disclosed above. The method includes a step of adding surfactant to a reagent complex according to Formula I:

$$M^0 \cdot X_y \quad \text{I,}$$

wherein $M^0$ is a zero-valent metal, X is a hydride, and y is an integral or fractional value greater than zero.

The electrode can be fabricated by any suitable technique, for example, a pressed powder film method, and can include non-active materials such as carbon black and a binding agent. In some instances, the electrode can comprise metal nanoparticles having an average maximum dimension less than 50 nm. In some instances, the electrode can comprise metal nanoparticles having an average maximum dimension less than 20 nm. In some instances, the electrode can comprise metal nanoparticles having an average maximum dimension of approximately 10 nm. In some instances, the electrode can comprise metal nanoparticles having an average maximum dimension less than 10 nm.

While the zero-valent metal, $M^0$, can be of any type as described above, in some instances the zero-valent metal employed in the nanoparticle synthesis method and incorporated into the electrode will be a transition metal or a post-transition metal. In some variations the electrode can include tin nanoparticles. In some particular variations, the electrode can include tin nanoparticles having an average maximum dimension of approximately 10 nm.

Also disclosed is an electrochemical cell having an electrode of the type disclosed above. The electrode includes an active material comprising metal nanoparticles which have been synthesized by a method including adding surfactant to a reagent complex according to Formula I:

$$M^0 \cdot X_y \quad \text{I,}$$

wherein $M^0$ is a zero-valent metal, X is a hydride, and y is an integral or fractional value greater than zero.

The electrode of the electrochemical cell referenced above can be an anode or a cathode, but in some particular cases can be an anode. In some such particular cases, the electrode can be an insertion-type anode. The electrochemical cell can employ any electrochemical reaction and can be of a type suitable for use in a battery, such as a lithium cell usable in a lithium ion battery, or can be of a type suitable for use as a fuel cell, such as a hydrogen fuel cell.

In some instances, the electrochemical cell can be magnesium electrochemical cell, or Mg-ion electrochemical cell, having a generic half-cell reaction of a type described partially by Reaction I:

$$Mg^{2+} + 2e^- \rightleftharpoons Mg^0 \quad \text{I.}$$

In some particular instances, the electrochemical cell can be an Mg-ion electrochemical cell having an insertion-type anode comprising nanoparticles synthesized according to the present disclosure, and including an operative half-cell reaction according to Reaction II:

$$\omega M^0 + \chi Mg^{2+} + 2\chi e^- \rightleftharpoons Mg_\chi M_\omega^0 \quad \text{II,}$$

wherein $M^0$ represents a zero-valent metal incorporated into metal nanoparticles according to the present disclosure, wherein $\chi$ is a stoichiometric quantity which can be an integral value greater than zero, and wherein $\omega$ is a stoichiometric quantity which can be an integral value greater than zero. In some such particular instances, $\chi$ can be any of one, two, and three and $\omega$ can be any of one, two, and three.

In some yet more particular instances, the electrochemical cell can be a Mg-ion electrochemical cell having an insertion-type anode comprising tin nanoparticles synthesized according to the present disclosure, and including an operative half-cell reaction according to Reaction III:

$$Sn + 2Mg^{2+} + 4e^- \rightleftharpoons Mg_2Sn \quad \text{III.}$$

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1. Nanoparticle Synthesis 0.503 g of tin metal powder and 0.187 g of lithium borohydride are combined in a planetary ball mill. The combination is ball-milled for 4 hours at 175 rpm (using a Fritsch pulverisette 7 planetary ball mill) in a 250 mL stainless steel airtight ball-mill jar with 1¾ inch, 3½ inch, and 5¼ inch 316 stainless steel ball bearings. The resulting ball-milled complex is suspended in THF. The suspension is titrated with a solution of 0.443 g octylamine in 10 mL of THF. The ensuing reaction proceeds at ambient temperature to completion in approximately 3 hours, resulting in zero-valent tin nanoparticles with an average grain size of about 11 nm, as shown in the x-ray diffraction spectrum of FIG. 1. The spectrum of FIG. 1 indexes to pure tin metal that is free of oxide species. The entire synthesis is performed in a glove box under inert conditions to avoid oxidation.

Example 2. Electrode Fabrication

An electrode is formed from tin nanoparticles, of the type synthesized in Example 1, by a pressed powder film method. Briefly, tin nanoparticles according to Example 1 (also referred to here as "active material"), carbon black, and polyvinylidene fluoride (also referred to here as "binder") were pressed together at 70% active material, 20% carbon black, and 10% binder, all percentages (w/w). Electrode fabrication is performed in a glove box under inert conditions to avoid material oxidation.

Example 3. Electrochemical Cell Construction and Testing

An electrode of Example 2 was incorporated into an electrochemical cell using a Tomcell structure. Briefly, the tin electrode of Example 2 (anode) was opposite a Mg foil electrode with a glass fiber separator. The electrolyte solution was 3:1 $LiBH_4$:$Mg(BH_4)_2$ in 1,2-dimethoxyethane.

Figure 3:
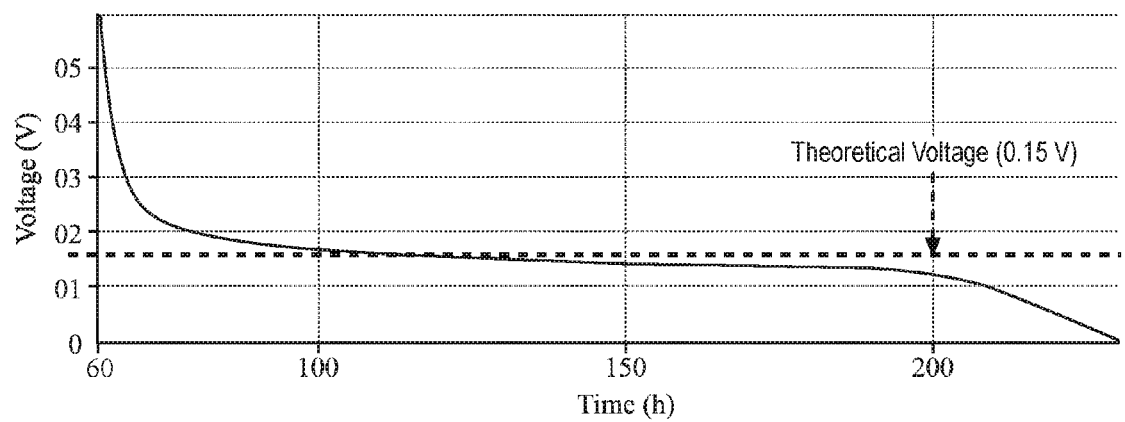
FIG. 3 is a first-cycle magnesiation curve for a Mg-ion electrochemical cell having an anode comprising tin nanoparticles synthesized by a disclosed method.

One cycle of anode magnesiation according to Reaction III was tested at 50° C. and at a C-rate of C/200. The first-cycle magnesiation curve is shown in FIG. 3. It is to be noted that the cell maintained an observed voltage virtually identical to the cell's theoretical voltage for essentially the duration of the cycle.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A magnesium electrochemical cell having;
   a magnesium metal cathode;
   an electrolyte solution of 3:1 $LiBH_4$:$Mg(BH_4)_2$ in 1,2-dimethoxyethane;
   an anode, the anode comprising tin nanoparticles, the tin nanoparticles having been synthesized by a method comprising:
   adding surfactant to a reagent complex according to a formula, $M^0.X_y$, wherein $M^0$ is zero-valent tin, X is a hydride, and y is an integral or fractional value greater than zero, and wherein the magnesium electrochemical cell maintains an electric potential equal to at least 80% of a theoretical electric potential for the cell during a first cycle magnesiation performed at 50° C. and a C-rate of C/200, and for a duration corresponding to at least 75% of a specific capacity for the anode.

2. The electrochemical cell of claim 1 wherein the electrode is an insertion-type anode.

3. The electrochemical cell of claim 1 wherein the tin nanoparticles have an average maximum dimension less than about 50 nm.

4. The electrochemical cell of claim 1 wherein the tin nanoparticles have an average maximum dimension less than about 20 nm.

5. The electrochemical cell of claim 1 wherein the tin nanoparticles have an average maximum dimension of about 10 nm or less.

6. The electrochemical cell of claim 1 having an operative electrochemical reaction according to a reaction:

$Sn + 2Mg^{2+} + 4e^- \rightleftharpoons Mg_2Sn$.

* * * * *

UNITED STATES PATENT AND TRADEMARK OFFICE
CERTIFICATE OF CORRECTION

PATENT NO. : 9,761,904 B2
APPLICATION NO. : 14/219836
DATED : September 12, 2017
INVENTOR(S) : Nikhilendra Singh et al.

It is certified that error appears in the above-identified patent and that said Letters Patent is hereby corrected as shown below:

In the Specification

Column 1, Line 38, "synthesis" should be -- syntheses --

Column 2, Line 14, "$M^0.X_y$" should be -- $M^0 \cdot X_y$ --

Column 2, Line 23, "$M^0. X_y$" should be -- $M^0 \cdot X_y$ --

Column 2, Lines 37-38, "$Sn.(LiBH_4)_2$" should be -- $Sn \cdot (LiBH_4)_2$ --

Column 2, Line 42, "$Sn.(LiBH_4)_2$" should be -- $Sn \cdot (LiBH_4)_2$ --

Column 3, Line 18, "$M^0-X_y$" should be -- $M^0 \cdot X_y$ --

Column 6, Line 52, "$Sn.(LiBH_4)_2$" should be -- $Sn \cdot (LiBH_4)_2$ --

Column 6, Line 61, "$Sn.(LiBH_4)_2$" should be -- $Sn \cdot (LiBH_4)_2$ --

Column 7, Line 38, "$M^0.X_y$" should be -- $M^0 \cdot X_y$ --

Column 7, Line 67, "$M^0.X_y$" should be -- $M^0 \cdot X_y$ --

Column 10, Line 9, "$M^0. X_y$" should be -- $M^0 \cdot X_y$ --

Column 10, Line 31, "$Sn+2Mg^2++4e^- \rightleftharpoons Mg_2Sn$" should be -- $Sn + 2Mg^{2+} + 4e^- \rightleftharpoons Mg_2Sn$ --

Signed and Sealed this
Twelfth Day of December, 2017

Joseph Matal
*Performing the Functions and Duties of the
Under Secretary of Commerce for Intellectual Property and
Director of the United States Patent and Trademark Office*